(12) United States Patent
Komatsu (10) Patent No.: US 6,722,775 B2
(45) Date of Patent: Apr. 20, 2004

(54) HEADLAMP DEVICE FOR VEHICLE

(75) Inventor: Motohiro Komatsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/213,841

(22) Filed: Aug. 7, 2002

(65) Prior Publication Data

US 2003/0031020 A1 Feb. 13, 2003

(30) Foreign Application Priority Data

Aug. 8, 2001 (JP) ..................... P.2001-240522

(51) Int. Cl.⁷ ................................. B60Q 1/00
(52) U.S. Cl. ................ 362/465; 362/466; 362/247; 362/276; 362/543; 362/212; 362/215; 315/82; 307/10.8; 701/49; 340/468; 340/469
(58) Field of Search ................ 362/247, 276, 362/465, 543, 212, 215; 315/82; 307/10.8; 701/49; 340/468, 469

(56) References Cited

U.S. PATENT DOCUMENTS 6,293,686 B1    9/2001   Hayami et al.
6,343,869 B1    2/2002   Kobayashi
2002/0001195 A1 * 1/2002  Iwamoto et al. ............ 362/466

* cited by examiner

Primary Examiner—Sandra O'Shea
Assistant Examiner—James W Cranson, Jr.
(74) Attorney, Agent, or Firm—Koda & Androlia (57) ABSTRACT

A vehicle headlamp including a headlamp unit and an auxiliary lamp in which the brightness of an end portion of the low beam light distribution pattern formed by the beam irradiation from the headlamp unit is reinforced by the auxiliary light distribution pattern formed by the beam irradiation from the auxiliary lamp unit. The high luminous intensity area of the auxiliary light distribution pattern partly overlaps the high luminous intensity area of the low beam light distribution pattern, thus allowing the low beam light distribution pattern and the auxiliary light distribution pattern to be combined. Further, by way of controlling the beam irradiation intensity of the auxiliary lamp unit by a light control unit, the brightness of the low beam light distribution pattern is reinforced by the auxiliary light distribution pattern that has brightness in response to the vehicle running condition.

8 Claims, 6 Drawing Sheets

HEADLAMP DEVICE FOR VEHICLE

BACKGROUND OF THE INVENTION

1. Field of the Invention

The present invention relates to a headlamp device for a vehicle that has an auxiliary lamp unit for reinforcing the brightness of the side end portion of a headlamp light distribution pattern.

2. Prior Art

In general, the headlamp for a vehicle is capable of selectively switching between a low beam light distribution pattern and a high beam light distribution pattern. However, in vehicle headlamps in which the structures of these respective light distribution patterns is fixed, it is difficult to execute a beam irradiation in accordance with a proper light distribution pattern in response to the condition of a running vehicle.

Accordingly, a vehicle headlamp device that overcomes such problems was demanded, and a headlamp device that uses an auxiliary lamp unit has been proposed. The auxiliary lamp unit executes a beam irradiation in accordance with its auxiliary light distribution pattern so as to reinforce the brightness of the side end portion of the headlamp light distribution pattern formed by the beam irradiation of the headlamp unit. The auxiliary lamp unit is turned on and off in response to the vehicle running condition.

Figure 6:
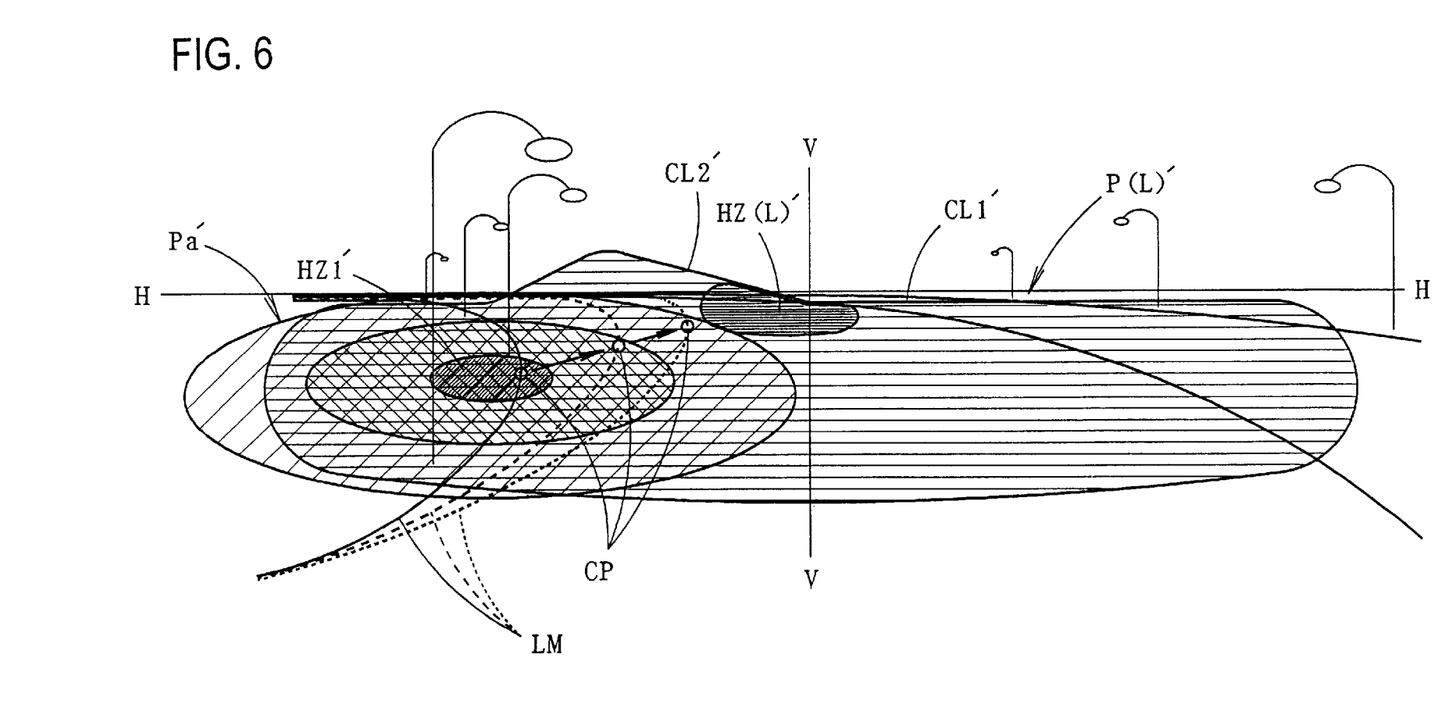
FIG. 6 is an illustration similar to that of FIG. 2, showing the light distribution patterns of a prior art lamp device.

FIG. 6 shows, in a perspective manner, a light distribution pattern formed by the headlamp device described above, assuming that the vehicle is turning left.

As seen from FIG. 6, in this headlamp device, a low beam irradiation is executed by the headlamp unit in accordance with its headlamp light distribution pattern P(L)' that has a horizontal cut-off line CL1' and an oblique cut-off line CL2', and a beam irradiation is executed by the auxiliary lamp unit in accordance with its auxiliary light distribution pattern Pa' so as to reinforce the brightness of the left end portion of the headlamp light distribution pattern P(L)'. With this headlamp device, the road surface in front of the vehicle at the time of turning left is broadly irradiated by way of simultaneously turning on the headlamp unit and the auxiliary lamp unit.

However, in the vehicle headlamp device described above, a high luminous intensity area (hot zone) HZ1' of the auxiliary light distribution pattern Pa' is formed at a position considerably apart from a high luminous intensity area HZ(L)' of the headlamp light distribution pattern P(L)'. Accordingly, the problem is that the portion between the high luminous intensity areas HZ(L)' and HZ1' on the road surface in front of the vehicle becomes relatively dark due to the contrast between the high luminous intensity areas HZ(L)' and HZ1'. As a result, the visibility in that portion is low.

In particular, the clipping point CP on a left curve road (a point to which it is considered that the driver pay his/her attention when turning left, that is, a position of the contact point when an eye point of the driver and the road shoulder side lane mark LM are connected with a tangent line) in front of the vehicle shifts toward the high luminous intensity area HZ(L)' of the headlamp light distribution pattern P(L)' as shown by arrows in FIG. 6 in accordance with the increase of the vehicle speed. Thus, the problem is that the high luminous intensity area HZ1' of the auxiliary light distribution pattern Pa' formed on the 0left front side significantly reduces the visibility of the clipping point CP at the time of turning left at a high speed.

SUMMARY OF THE INVENTION

The present invention is made in light of the problems with the conventional vehicle headlamps described above.

It is an object of the present invention to provide an improvement in a headlamp device for a vehicle that is provided with an auxiliary lamp unit which executes a beam irradiation in accordance with its auxiliary light distribution pattern so as to reinforce the brightness of the side end portion of a headlamp light distribution pattern; and in the present invention, the vehicle headlamp device sufficiently increases the visibility of the road surface in front of the vehicle at the time of turning of the vehicle.

In other words, the present invention accomplishes the above object by applying innovation to the luminous intensity distribution in an auxiliary light distribution pattern and by providing a structure capable of controlling the light.

More specifically, the above object is accomplished by a unique structure for a headlamp device for a vehicle that includes:

a headlamp unit which irradiates a beam toward a front side of a vehicle in accordance with a predetermined headlamp light distribution pattern thereof, and an auxiliary lamp unit which irradiates a beam in accordance with an auxiliary light distribution pattern thereof so as to reinforce the brightness of a side end portion of the headlamp light distribution pattern; and in the present invention:

the high luminous intensity area of the auxiliary light distribution pattern is formed at a position closer to the high luminous intensity area of the headlamp light distribution pattern than to the center position of the auxiliary light distribution pattern, and a light control means that varies the beam irradiation intensity of the auxiliary lamp unit is connected to the auxiliary lamp unit.

The specific structures of the "headlamp unit" and the "auxiliary lamp unit" are not particularly limited; and, for instance, a so-called parabola type lamp device unit and a so-called projector type lamp device unit can be employed therefor. In addition, the structures of the light sources for the "headlamp unit" and the "auxiliary lamp unit" are not particularly limited; and, for instance, a discharge light-emitting portion of a discharge bulb and a filament of an incandescent bulb such as a halogen bulb can be employed as the light sources of the headlamp unit and the auxiliary lamp unit.

Furthermore, the "auxiliary lamp unit" can be a lamp that reinforces the brightness of either the right or left end portions of the headlamp light distribution pattern by the auxiliary light distribution pattern formed by the beam irradiation from the auxiliary lamp unit.

The "headlamp light distribution pattern" refers to a light distribution pattern that carries out a function of a headlamp, and it includes a high beam light distribution pattern and a low beam light distribution pattern.

The "light control means" is not particularly limited in its specific contents of variable control as long as it can vary the beam irradiation intensity of the auxiliary lamp unit.

As seen from the above, the headlamp device for a vehicle according to the present invention includes a headlamp unit, which irradiates the beam toward the front of the vehicle in accordance with its headlamp light distribution pattern, and a auxiliary lamp unit, which irradiates the beam in accordance with its auxiliary light distribution pattern so as to reinforce the brightness of the side end portion of the headlamp light distribution pattern; and in the present invention, the high luminous intensity area of the auxiliary light distribution pattern is formed at the position closer to the high luminous intensity area of the headlamp light distribution pattern than to the center position of the auxiliary light distribution pattern. Accordingly, the headlamp light distribution pattern and the auxiliary light distribution pattern are smoothly combined together, while the brightness of the side end portion of the headlamp light distribution pattern is reinforced by the auxiliary light distribution pattern of the auxiliary lamp unit.

Further, in the present invention, the light control means that varies the beam irradiation intensity of the auxiliary lamp unit is connected to the auxiliary lamp unit. Accordingly, the auxiliary light distribution pattern can be formed in response to the vehicle running condition. When the beam irradiation intensity of the auxiliary lamp unit is gradually increased by the light control means, the high luminous intensity area becomes bright at first, then the periphery gradually becomes bright, and at last the entire auxiliary light distribution pattern becomes bright. Accordingly, the headlamp light distribution pattern and the auxiliary light distribution pattern are smoothly combined together, and the brightness of the side end portion of the headlamp light distribution pattern is reinforced by the auxiliary light distribution pattern that has a required brightness.

As seen from the above, the headlamp device for a vehicle of the present invention is provided with an auxiliary lamp unit that executes the beam irradiation in accordance with its auxiliary light distribution pattern for reinforcing the brightness of the side end portion of the headlamp light distribution pattern. As a result, the visibility of the road surface in front of the running vehicle can be sufficiently increased at the time of turning.

The "light control means" used in the above structure reduces the beam irradiation intensity in response to the increase of the vehicle speed.

Accordingly, the advantage is that it is possible to sufficiently irradiate a clipping point, which is positioned comparatively close and on one side of the road surface in front of the vehicle, by way of executing a beam irradiation so that the entire auxiliary light distribution pattern is formed on the road surface in front of the vehicle at the time of turning at a low speed. On the other hand, at the time of turning at a high speed, the beam irradiation is executed so that only the high luminous intensity area of the auxiliary light distribution pattern is formed on the road surface in front of the vehicle. Thus, a clipping point which is positioned close to a far center of the road surface in front of the vehicle is irradiated, while the area just before the clipping point is prevented from becoming too bright which would reduce the visibility of the clipping point.

Furthermore, in the structure of the present invention, a semi-high luminous intensity area (which is darker than the high luminous intensity area but is brighter than the other areas in the auxiliary light distribution pattern) of the auxiliary light distribution pattern is formed so as to extend obliquely downward from the high luminous intensity area of the auxiliary light distribution pattern toward a side laterally opposite the high luminous intensity area of the headlamp light distribution pattern. Accordingly, it is possible to sufficiently irradiate the clipping point even at the time of turning at a low speed and at a middle speed. It is also possible to prevent the portions other than the clipping point on the road surface in front of the vehicle from being irradiated too much which would reduce the visibility of the clipping point.

The specific structure of the "auxiliary lamp unit" is not particularly limited to that described above. However, when the auxiliary lamp unit has a reflector which is sectioned into a plurality of reflection surface areas, and the high luminous intensity area, the semi-high luminous intensity area and the other areas of the auxiliary light distribution pattern are formed by reflection lights from reflection surface areas which are different from each other in the reflector, then the auxiliary light distribution pattern can be easily formed with a target luminous intensity distribution.

DETAILED DESCRIPTION OF THE INVENTION

A detailed description of the embodiments of the present invention will be given below with reference to the accompanying drawings.

Figure 1:
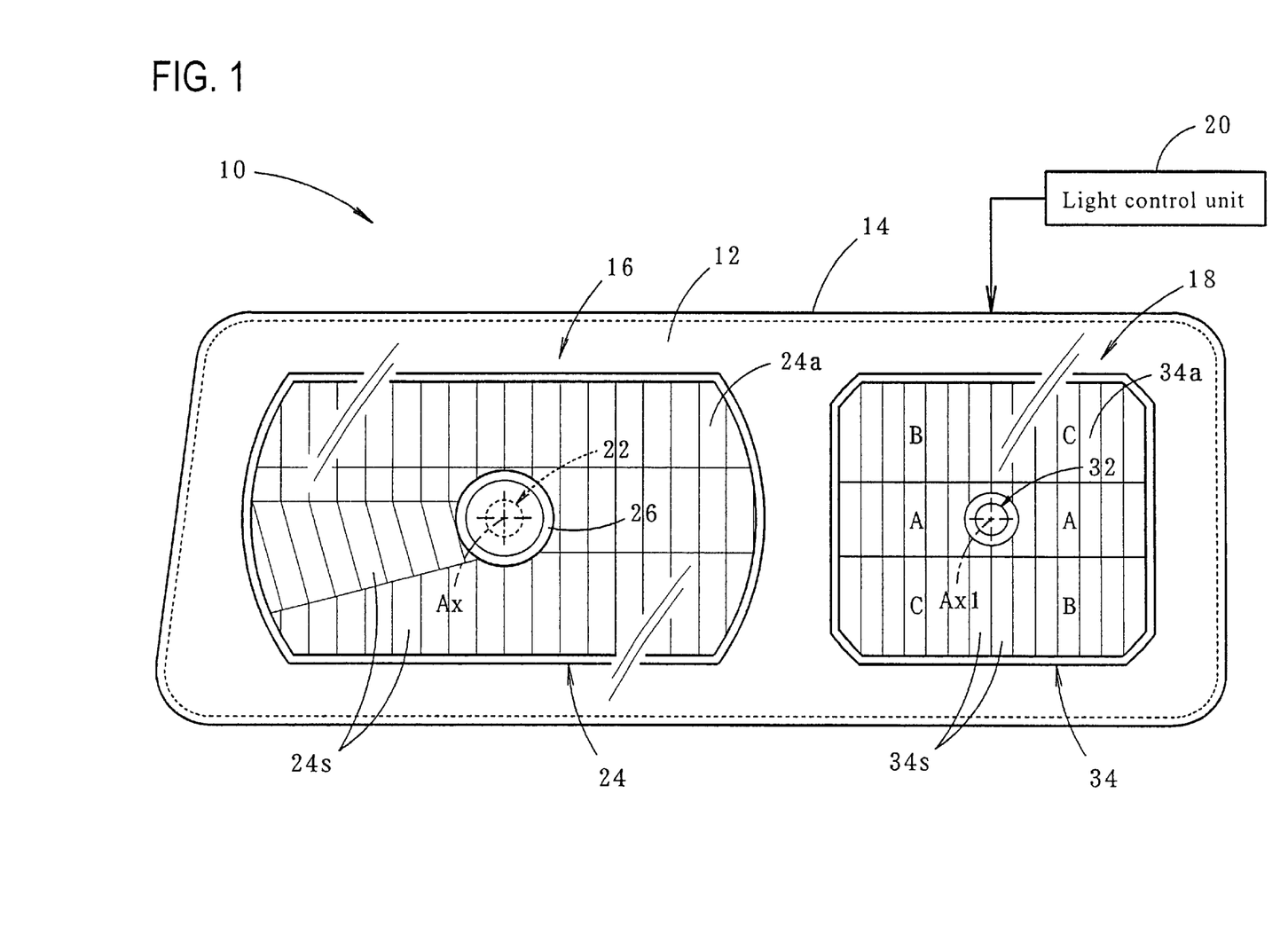
FIG. 1 is a front view of the headlamp device for a vehicle according to embodiment of the present invention.

FIG. 1 shows the headlamp device for a vehicle according to the embodiment of the present invention.

The headlamp device 10 is provided on the left side of a vehicle front end portion. The headlamp device 10 includes a headlamp unit 16 and an auxiliary lamp unit 18 that are accommodated within a lamp chamber formed by a plain translucent cover 12 and a lamp body 14. A light control unit 20 is connected to an auxiliary lamp unit 18.

The headlamp unit 16 is provided with a light source bulb (H4 halogen bulb) 22, a reflector 24 and a shade 26. The headlamp unit 16 is supported by the lamp body 14 via an aiming mechanism (not shown). The headlamp unit 16 is thus capable of tilting in a vertical direction and a lateral direction.

The reflector 24 has a reflection surface 24a in which a plurality of reflection elements 24s are formed on a paraboloid of revolution that has an optical axis Ax extending in a vehicle longitudinal direction as a center axis. The reflection surface 24a diffuses, deflects and reflects forward the light from the light source (a filament for a low beam or a filament for a high beam) of the light source bulb 22, thus irradiating a beam in front of the vehicle in accordance with a predetermined light distribution pattern thereof (that is referred to as a "headlamp light distribution pattern"). When the filament for the low beam is turned on, a low beam light distribution pattern P(L) shown in FIG. 2 is formed.

Figure 2:
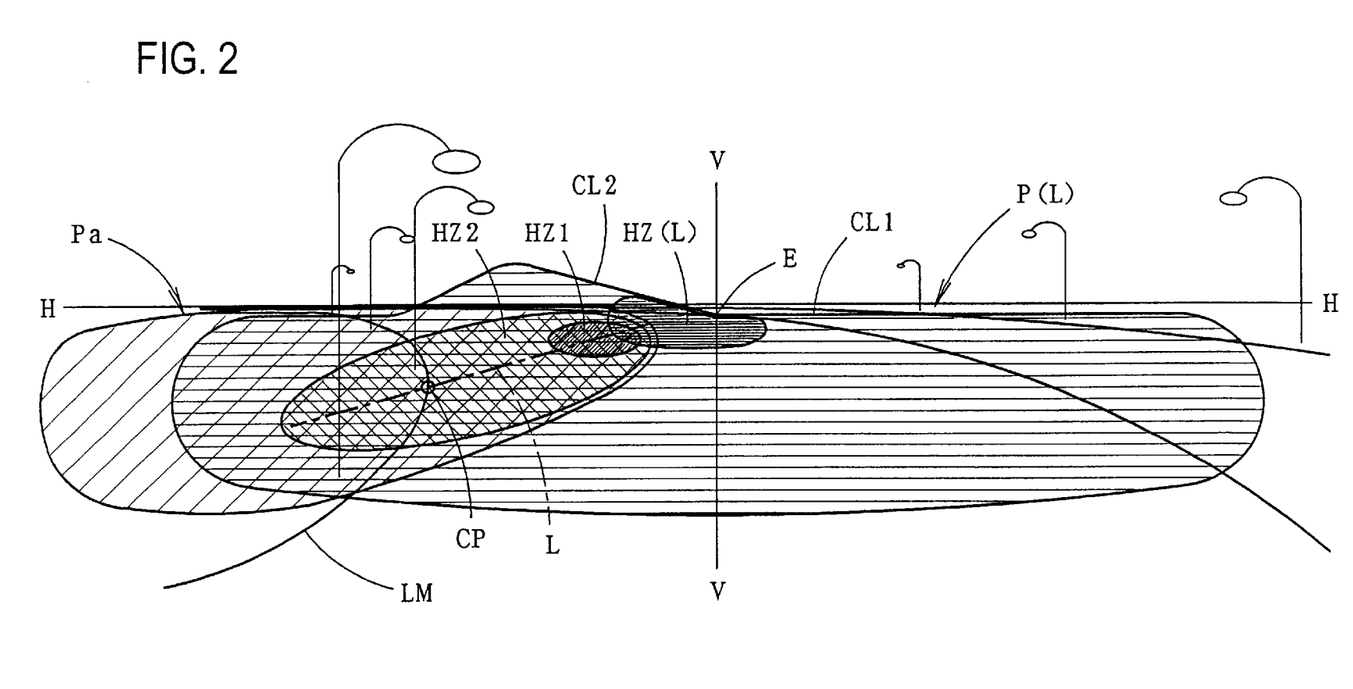
FIG. 2 shows in a perspective manner a low beam light distribution pattern which is formed by the headlamp unit of the headlamp device on a virtual vertical screen arranged at a position 25 meters ahead of the lamp device, assuming that the vehicle is turning left, an auxiliary light distribution pattern formed by the auxiliary lamp unit of the headlamp device being also shown in FIG. 2.

FIG. 2 shows in a perspective manner the low beam light distribution pattern P(L) formed on a virtual vertical screen arranged at a position 25 meters ahead of the lamp device together with an auxiliary light distribution pattern Pa which will be described later. FIG. 2 shows the light distribution patterns with an assumption that the vehicle is turning left.

The low beam light distribution pattern P(L) is a low beam light distribution pattern for the left light distribution; and it has a horizontal cut-off line CL1 on the right side (on the opposite lane side) of the V—V line (which is a vertical line passing through the optical axis Ax) and has an oblique cut-off line CL2 rising upward at an angle of 15 degrees from the horizontal cut-off line CL1 on the left side (its own lane side) of the V—V line. The horizontal cut-off line CL1 is formed slightly downward (at about 0.5 to 0.6 degrees) with respect to the H—H line (a horizontal line passing through the optical axis Ax). Further, in this low beam light distribution pattern P(L), a high luminous intensity area (a hot zone) HZ(L) is formed. The high luminous intensity area HZ(L) has a larger area on the left side than on the right side with respect to the intersecting point (an elbow point E) formed by the horizontal cut-off line CL1 and the oblique cut-off line CL2.

As seen from FIG. 1, the auxiliary lamp unit 18 is installed on the left side (which is the right side in FIG. 1) of the headlamp unit 16 and includes a light source bulb (which is an H7 halogen bulb of a single filament type) 32 and a reflect or 34.

The reflector 34 has a reflection surface 34a in which a plurality of reflection elements 34s are formed on a paraboloid of revolution having the optical axis Ax1 extending in the vehicle longitudinal direction as a center axis. The reflection surface 34a diffuses, deflects and reflects the light forward from the light source bulb 32 by the reflection surface 34a so as to irradiate a beam in front of the vehicle in accordance with its auxiliary light distribution pattern Pa as shown in FIG. 2, thereby reinforcing the brightness of the left end portion of the low beam light distribution pattern P(L).

While the auxiliary light distribution pattern Pa is formed so as to cover the left end portion of the low beam light distribution pattern P(L), the right end portion of the auxiliary light distribution pattern Pa is formed so as to extend in a substantially wedge shape toward the H-V point (which is an intersecting point formed by the H—H line and the V—V line). The high luminous intensity area HZ1 of the auxiliary light distribution pattern Pa is formed in a portion close to an upper end edge of the right end portion of the auxiliary light distribution pattern Pa, and a part thereof is overlapped with the high luminous intensity area HZ(L) of the low beam light distribution pattern P(L). Further, the semi-high luminous intensity area HZ2 (which is darker than the high luminous intensity area HZ1 but is brighter than the other areas in the auxiliary light distribution pattern Pa) is formed in the auxiliary light distribution pattern Pa so as to extend obliquely downward from the high luminous intensity area HZ1.

In FIG. 2, the point CP on the road shoulder side lane mark LM on a left curve road in front of the vehicle is a clipping point (a point to which it is considered that a driver pays his/her attention when turning left). This clipping point CP is defined as a position of a contact point when an eye point of the driver (roughly the center of the vehicle) and the road shoulder side lane mark LM are connected to the tangent line. The position of the clipping point CP differs depending upon the radius of curvature of the left curve road (or the radius of curvature of the road shoulder side lane mark LM).

Figure 3:
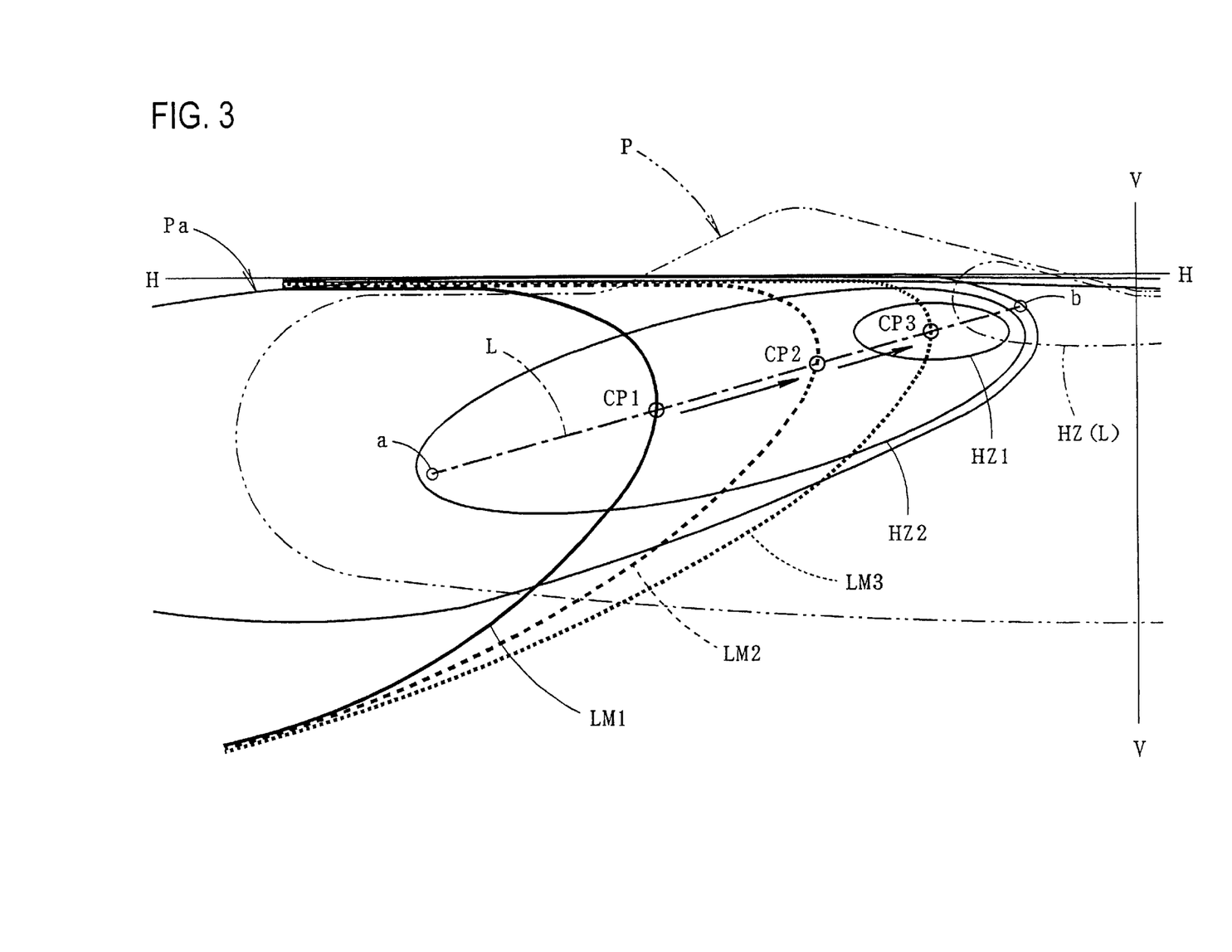
FIG. 3 is a partly enlarged view of FIG. 2, showing the auxiliary light distribution pattern in detail.

More specifically, as seen from FIG. 3, as the radius of curvature of the road shoulder side lane mark LM becomes larger in the order of LM1→LM2→LM3, the clipping point CP shifts toward the H-V point in the order of CP1→CP2→CP3. In general, since the radius of curvature of the road shoulder side lane mark LM becomes larger when the vehicle speed is high at the time of turning left, the clipping point CP shifts in the order of CP1→CP2→CP3 in accordance with the increase of the vehicle speed.

The semi-high luminous intensity area HZ2 of the auxiliary light distribution pattern Pa is formed so as to cover the clipping point shifting locus L(a straight line extending obliquely downward to the left from the H-V point). Further, the high luminous intensity area HZ1 of the auxiliary light distribution pattern Pa is formed so as to cover the clipping point CP3 in a high vehicle speed range.

Figure 4:
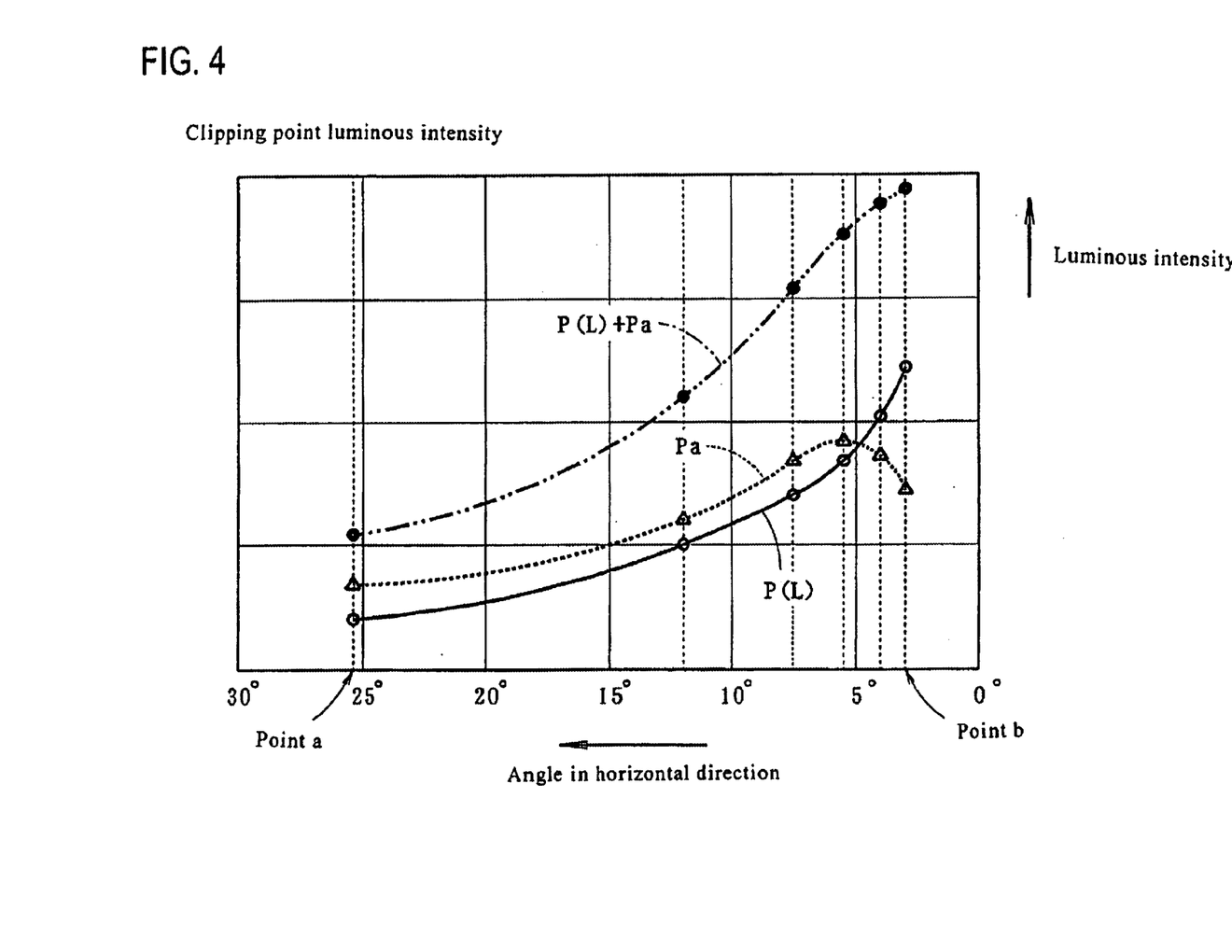
FIG. 4 is a graph showing the luminous intensity distributions of the low beam light distribution pattern and the auxiliary light distribution pattern along a clipping point shifting locus.

FIG. 4 shows luminous intensity distributions of the low beam light distribution pattern P(L) and the auxiliary light distribution pattern Pa, from a point a which is in the lower vehicle speed side than the clipping point CP1 to a point b which is in the higher vehicle speed side than the clipping point CP3, along the clipping point shifting locus L.

As seen from FIG. 4, the low beam light distribution pattern P(L) has a luminous intensity distribution in which the luminous intensity monotonously increases from the point a to the point b, and the luminous intensity increasing rate increases as the point shifts closer to the point b. To the contrary, the auxiliary light distribution pattern Pa has a luminous intensity distribution in which the luminous intensity monotonously increases from the point a to a point close to the point b, and thereafter the luminous intensity reduces toward the point b. Further, a combined light distribution pattern (P(L)+Pa) of the low beam light distribution pattern P(L) and the auxiliary light distribution pattern Pa has a luminous intensity distribution in which the luminous intensity smoothly increases from the point a to the point b, but the luminous intensity increasing rate slightly decreases from the point close to the point b toward the point b.

As seen from FIG. 1, the reflector 34 of the auxiliary lamp unit 18 of the shown embodiment is structured so that its reflection surface 34a is sectioned into three pairs of reflection surface areas A, B and C. Since the reflection light from the reflection surface areas A located on both right and left sides of the optical axis Ax1 is likely to form an image that has a narrow vertical width, the high luminous intensity area HZ1 is formed by the reflection light from the reflection surface areas A. Further, since the reflection light from the reflection surface areas B located in the upper right side and the lower left side of the optical axis Ax1 (the upper left side and a lower right side in FIG. 1) is likely to form an image that extends from the right upper side to the lower left side, the semi-high luminous intensity area HZ2 is formed by the reflection light from the reflection surface areas B. The remaining area (a wide diffusion area) of the auxiliary light distribution pattern Pa is formed by the reflection light from the remaining reflection surface areas C.

The light control unit 20 varies the beam irradiation intensity of the auxiliary lamp unit 18 in response to the vehicle running condition.

More specifically, the light control unit 20 feeds the power to the light source bulb 32 at the time when the vehicle turns left. The feed voltage is constant in a low vehicle speed range (for example, 40 km/h or lower); and for the middle and high vehicle speed range, the feed voltage is set so that the beam irradiation intensity lowers in accordance with the increase of the vehicle speed. With this light control unit 20, the entire auxiliary light distribution pattern Pa becomes bright in the low vehicle speed range, whereas only the high luminous intensity area HZ1 and the semi-high luminous intensity area HZ2 become bright in the middle vehicle speed range, and only the high luminous intensity area HZ1 becomes bright in the high vehicle speed range.

As described above in detail, the headlamp device 10 for a vehicle in the shown embodiment is provided with the headlamp unit 16, which irradiates the beam in front of the vehicle in accordance with its low beam light distribution pattern P(L), and the auxiliary lamp unit 18, which irradiates the beam in accordance with its auxiliary light distribution pattern Pa so as to reinforce the brightness of the left end portion of the low beam light distribution pattern P(L). In addition, the high luminous intensity area HZ1 of the auxiliary light distribution pattern Pa partly overlaps the high luminous intensity area HZ(L) of the low beam light distribution pattern P(L). Accordingly, the low beam light distribution pattern P(L) and the auxiliary light distribution pattern Pa are smoothly combined, while the brightness of the left end portion of the low beam light distribution pattern P(L) is reinforced by the auxiliary light distribution pattern Pa.

Further, since the light control unit 20 which varies the beam irradiation intensity is connected to the auxiliary lamp unit 18, the auxiliary lamp unit 18 is able to form the auxiliary light distribution pattern Pa in response to the vehicle running condition. More specifically, when the beam irradiation intensity of the auxiliary lamp unit 18 is gradually increased by the light control unit 20, the high luminous intensity area HZ1 becomes bright at first, then the periphery thereof gradually becomes bright, and at last the entire auxiliary light distribution pattern Pa becomes bright. Accordingly, the low beam light distribution pattern P(L) and the auxiliary light distribution pattern Pa are smoothly combined, while the brightness of the left end portion of the low beam light distribution pattern P(L) is reinforced by the auxiliary light distribution pattern Pa that has a required brightness.

As seen from the above, according to the shown embodiment, in the low beam irradiation state, the visibility of the road surface in front of the vehicle at the time of turning left is sufficiently high.

Further, since the light control unit 20 reduces the beam irradiation intensity in accordance with the increase of the vehicle speed, the following advantages are obtained.

At the time of turning at a low speed, the beam irradiation is executed so as to form the entire auxiliary light distribution pattern Pa on the road surface in front of the vehicle, thus the clipping point CP1 positioned comparatively close and on one side of the road surface in front of the vehicle is sufficiently irradiated. To the contrary, at the time of turning at a high speed, the beam irradiation is executed so as to form only the high luminous intensity area HZ1 of the auxiliary light distribution pattern Pa on the road surface in front of the vehicle. Thus, the clipping point CP3 which is positioned close to the far center of the road surface in front of the vehicle is irradiated, while the area just before the clipping point CP3 is prevented from becoming too bright which would reduce the visibility of the clipping point CP3.

Furthermore, in the above embodiment, the semi-high luminous intensity area HZ2 of the auxiliary light distribution pattern Pa is formed so as to extend obliquely downward to the left from the high luminous intensity area HZ1. Therefore, it is possible to sufficiently irradiate the clipping points CP1 and CP2 even at the time of turning at a low speed and at a middle speed, and it is also possible to prevent the portion other than the clipping point shifting locus L on the road surface in front of the vehicle from being irradiated more than necessary which would reduce the visibility of the clipping points CP1 and CP2.

In the shown embodiment, the reflector 34 of the auxiliary lamp unit 18 has the reflection surface 34a which is sectioned into a plurality of reflection surface areas A, B and C; and the high luminous intensity area HZ1, the semi-high luminous intensity area HZ2 and the other area of the auxiliary light distribution pattern Pa are respectively formed by the reflection lights from the respective reflection surface areas A, B and C. Accordingly, the auxiliary light distribution pattern Pa can be easily formed with the target luminous intensity distribution.

Figure 5:
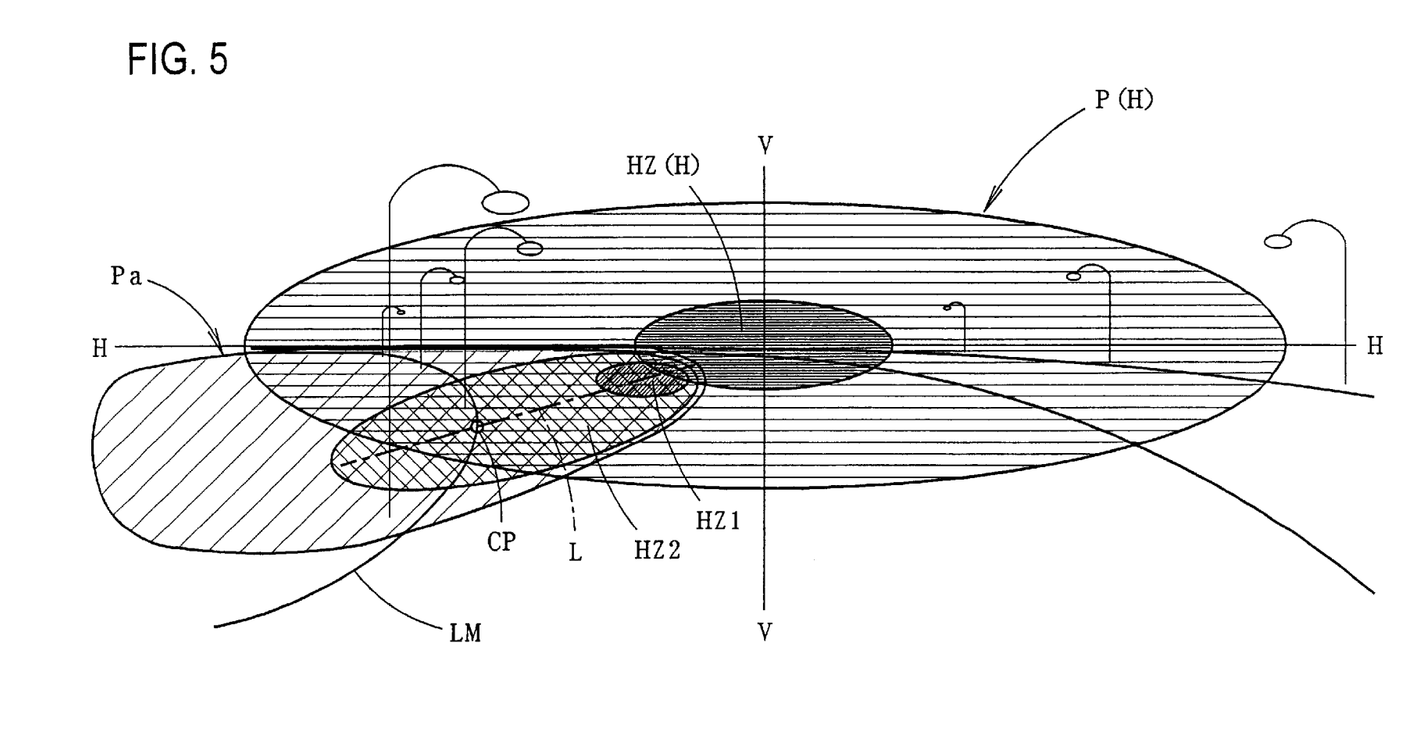
FIG. 5 shows in a perspective manner the low beam light distribution pattern which is formed by the headlamp unit of the headlamp device on a virtual vertical screen arranged at a position 25 meters ahead of the lamp device, assuming that the vehicle is turning left, the auxiliary light distribution pattern formed by the auxiliary lamp unit being also shown in FIG. 5.

FIG. 5 shows in a perspective manner the high beam light distribution pattern P(H) formed on a virtual vertical screen arranged at a position 25 meters ahead of the lamp device by lighting the filament for the high beam in the light source bulb 22, in the headlamp device 10, together with the auxiliary light distribution pattern Pa. FIG. 5 shows such light distribution patterns with an assumption that the vehicle is turning left.

As seen from FIG. 5, the high luminous intensity area HZ(H) of the high beam light distribution pattern P(H) is formed around the H-V point, and a part thereof is overlapped with the high luminous intensity area HZ1 of the auxiliary light distribution pattern Pa. Accordingly, the high beam light distribution pattern P(H) and the auxiliary light distribution pattern Pa are smoothly combined, while the brightness of the left end portion of the high beam light distribution pattern P(H) is reinforced by the auxiliary light distribution pattern Pa.

In the headlamp device of embodiment of FIG. 5, the visibility of the road surface in front of the vehicle at the time of turning left sufficiently increases even in the high beam irradiation state.

In the headlamp device 10 for a vehicle of the above embodiments, the headlamp unit 16 and the auxiliary lamp unit 18 assume the light distribution control function with the respective reflectors 24 and 34. The light distribution control function can be achieved also by way of forming a lens element in the translucent cover 12.

The above embodiments are described with reference to the headlamp device 10 that is provided on the left side of the vehicle front end portion. However, even with a headlamp device provided on the right side of the vehicle front end portion, it is, according to the present invention, possible to sufficiently increase the visibility of the road surface in front of the vehicle at the time of turning right. In such a headlamp device, the headlamp unit is the same as the headlamp unit 16 described above, and the auxiliary lamp unit has a laterally symmetrical structure with the auxiliary lamp unit 18 described above; and the brightness of the right end portion of the low beam light distribution pattern (or the high beam light distribution pattern) is reinforced by its auxiliary light distribution pattern.

Claims:

1. A headlamp device for a vehicle comprising:
   a headlamp unit which irradiates a beam toward a front side of a vehicle in accordance with a predetermined headlamp light distribution pattern, and an auxiliary lamp unit which irradiates a beam in accordance with an auxiliary light distribution pattern for reinforcing a brightness of a side end portion of said headlamp light distribution pattern; wherein a high luminous intensity area of said auxiliary light distribution pattern is formed at a position closer to a high luminous intensity area of said headlamp light distribution pattern than to a center position of said auxiliary light distribution pattern, and a light control means for varying a beam irradiation intensity of said auxiliary lamp unit is connected to said auxiliary lamp unit.

2. The headlamp device for a vehicle according to claim 1, wherein said light control means reduces said beam irradiation intensity in response to an increase of a vehicle speed.

3. The headlamp device for a vehicle according to claim 1, wherein a semi-high luminous intensity area of said auxiliary light distribution pattern is formed so as to extend obliquely downward from said high luminous intensity area of said auxiliary light distribution pattern toward a side which is laterally opposite from said high luminous intensity area of said headlamp light distribution pattern.

4. The headlamp device for a vehicle according to claim 1, wherein said auxiliary lamp unit has a reflector which is sectioned into a plurality of reflection surface areas, and said high luminous intensity area, said semi-high luminous intensity area and other areas of said auxiliary light distribution pattern are formed by reflection lights reflected from reflection surface areas which are different from each other in said reflector.

5. The headlamp device for a vehicle according to claim 2, wherein a semi-high luminous intensity area of said auxiliary light distribution pattern is formed so as to extend obliquely downward from said high luminous intensity area of said auxiliary light distribution pattern toward a side which is laterally opposite from said high luminous intensity area of said headlamp light distribution pattern.

6. The headlamp device for a vehicle according to claim 2, wherein said auxiliary lamp unit has a reflector which is sectioned into a plurality of reflection surface areas, and said high luminous intensity area, said semi-high luminous intensity area and other areas of said auxiliary light distribution pattern are formed by reflection lights reflected from reflection surface areas which are different from each other in said reflector.

7. The headlamp device for a vehicle according to claim 3, wherein said auxiliary lamp unit has a reflector which is sectioned into a plurality of reflection surface areas, and said high luminous intensity area, said semi-high luminous intensity area and other areas of said auxiliary light distribution pattern are formed by reflection lights reflected from reflection surface areas which are different from each other in said reflector.

8. The headlamp device for a vehicle according to claim 5, wherein said auxiliary lamp unit has a reflector which is sectioned into a plurality of reflection surface areas, and said high luminous intensity area, said semi-high luminous intensity area and other areas of said auxiliary light distribution pattern are formed by reflection lights reflected from reflection surface areas which are different from each other in said reflector.

\* \* \* \* \*